(12) United States Patent
Ceccarelli et al.

(10) Patent No.: US 9,294,416 B2
(45) Date of Patent: Mar. 22, 2016

(54) METHOD OF AND APPARATUS FOR CONFIGURING QUALITY OF SERVICE

(75) Inventors: Daniele Ceccarelli, Genoa (IT); Diego Caviglia, Savona (IT); Francesco Fondelli, Calcinaia (IT)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 13/378,173

(22) PCT Filed: Jul. 14, 2011

(86) PCT No.: PCT/EP2011/062053
§ 371 (c)(1),
(2), (4) Date: Sep. 26, 2012

(87) PCT Pub. No.: WO2012/167843
PCT Pub. Date: Dec. 13, 2012

(65) Prior Publication Data
US 2013/0021908 A1    Jan. 24, 2013

(30) Foreign Application Priority Data
Jun. 10, 2011  (EP) .................................. 11169406

(51) Int. Cl.
| | |
|---|---|
| H04L 12/24 | (2006.01) |
| H04L 12/28 | (2006.01) |
| H04L 12/911 | (2013.01) |
| H04L 12/723 | (2013.01) |
| H04L 12/913 | (2013.01) |
| H04L 12/927 | (2013.01) |

(52) U.S. Cl.
CPC .............. *H04L 47/825* (2013.01); *H04L 45/50* (2013.01); *H04L 47/724* (2013.01); *H04L 47/805* (2013.01)

(58) Field of Classification Search
CPC ..... H04L 45/50; H04L 47/825; H04L 47/805; H04L 47/724
USPC .................................................. 370/236, 389
See application file for complete search history.

(56) References Cited

U.S. PATENT DOCUMENTS

| | | | |
|---|---|---|---|
| 8,064,440 B2 * | 11/2011 | Bhaskar ......................... 370/389 |
| 2010/0103942 A1 * | 4/2010 | Caviglia et al. ............... 370/400 |
| 2012/0134365 A1 * | 5/2012 | Guo ......................... H04L 69/24 370/400 |

FOREIGN PATENT DOCUMENTS

WO    2008/095976 A1    8/2008

OTHER PUBLICATIONS

Berger, "Generalized Multi-Protocol Label Switching (GMPLS) Signaling Functional Description" RFC 3471; Jan. 2003.*

(Continued)

*Primary Examiner* — Andrew Lai
*Assistant Examiner* — Albert Shih
(74) *Attorney, Agent, or Firm* — Nixon & Vanderhye, P.C.

(57) ABSTRACT

In a method of configuring quality of service for a return path of a bi-directional label switched path within a network a label information context for a quality of service configuration of the return path of a label switched path is configured separately from a quality of service configuration for the forward path. Path set up messages are formed containing a return path quality of service object indicating the quality of service configuration for the return path separately from a quality of service configuration for the forward path.

15 Claims, 7 Drawing Sheets

(56) References Cited

OTHER PUBLICATIONS

Le Faucher, "Multiprotocol Label Switching MPLS Support of Differentiated Services", RFC 3270; May 2002.*

Braden, "Resource Reservation Protocol RSVP Version 1 Functional Specification", RFC 2205; Sep. 1997.*

F. Le Faucheur, et al., "Multi-Protocol Label Switching (MPLS) Support of Differentiated Services," Network Working Group, RFC 3270.

R. Braden, et al., "Resource Reservation Protocol (RSVP)—Version 1 Functional Specification," Network Working Group, RCF 2205.

International Search Report and Written Opinion mailed Mar. 26, 2012 in PCT Application No. PCT/EP2011/062053.

Takacs et al, "GMPLS RSVP-TE Extension in Support of Bidirectional LSPs with Asymetric Bandwidth Requirements", draft-takacs-asym-bw-lsp-00.txt, Feb. 1, 2007.

Dube et al, "Bi-Directions LSPs for Classical MPLS", draft-dube-bidirectional-lsp-01.txt, Jul. 1, 2003.

* cited by examiner

METHOD OF AND APPARATUS FOR CONFIGURING QUALITY OF SERVICE

This application is the U.S. national phase of International Application No. PCT/EP2011/062053 filed 14 Jul. 2011 which designated the U.S. and claims priority to EP 11169406.3 filed 10 Jun. 2011, the entire contents of each of which are hereby incorporated by reference.

FIELD OF THE INVENTION

The present invention relates to configuring the quality of service in a label switched network. In particular, the invention relates to configuring quality of service (QoS) for the return path of a bi-directional label switched path in a label switched network.

BACKGROUND

In a network that supports label switched paths (LSPs), such as a Generalised Multi-protocol Label Switching (GM-PLS) network, label switched paths (LSPs) between nodes of the network are used to transport traffic across the network. Thus a label is applied to a packet containing traffic that has arrived at an ingress node of the label switched path before the labelled packet containing the traffic is sent to a successive node in the label switched path. At each of the successive nodes along the label switched path, the packet containing the traffic is routed according to the label applied to the packet. Typically the label switched paths in such a network may be a unidirectional label switched path (LSP) or may be a bi-directional label switched path (LSP).

In such a network supporting label switched paths it is possible to control the bandwidth allocated to a label switched path and also the quality of service (QoS) provided by a label switched path (LSP).

Currently, it is possible to specify different bandwidth allocations for the forward and return path (upstream and downstream directions) of the bidirectional label switched path (LSP). However it is not possible to specify the quality of service (QoS) to be applied to the return path of a bi-directional label switched path separately from the quality of service (QoS) specified for the forward path, for example to configure a different quality of service (QoS) for the forward and return paths of a bi-directional label switched path.

The present invention seeks at least to ameliorate disadvantages of the prior art and to provide a novel method of and apparatus for configuring quality of service (QoS) for the return path of a bi-directional label switched path.

SUMMARY

In accordance with a one aspect of the invention there is provided a method of configuring quality of service for a return path of a bi-directional label switched path within a network, the bi-directional label switched path having a forward path and a return path. The method comprises a first step of configuring a label information context for a quality of service configuration of the return path of a label switched path separate from a quality of service configuration for the forward path. In a second step a path set up message is formed containing a return path quality of service object indicating the quality of service configuration for the return path separately from a quality of service configuration for the forward path. In a third step sending the path set up message containing the return path quality of service object is sent to a node in the switched path.

In some embodiments the method also includes an initial step of receiving a path set up message containing a return path quality of service object indicating a quality of service configuration for the return path. In a further step the quality of service configuration of the return path indicated by the received return path quality of service object is determined. Finally, the determined quality of service configuration of the return path is used in the step of configuring the label information context.

In some embodiments the method also includes the step of receiving a path reservation message corresponding to a previously handled path set up message. The corresponding configured label information context for the quality of service configuration of the return path is then activated.

In some embodiments the method also includes the step of sending a path reservation message corresponding to the received path reservation message to an adjacent node in the switched path.

In accordance with an aspect of the invention, there is provided a method of configuring quality of service for a return path of a bi-directional label switched path within a network, the bi-directional label switched path having a forward path and a return path. In a first step, a path set up message is received containing a return path quality of service object indicating a quality of service configuration for the return path separately from a quality of service configuration for the forward path. In a second step a label information context for a quality of service configuration of the return path of a label switched path is configured using quality of service configuration of the return path indicated by the received return path quality of service object. In a third step, a path reservation message corresponding to the received path set up message is sent to a node in the switched path.

In some embodiments the path set up message also includes a forward path quality of service object indicating a quality of service configuration for the forward path and the method also includes the step of configuring a label information context for a quality of service configuration of the forward path indicated by the forward path quality of service object.

In some embodiments the quality of service configuration of the return path of a label switched path specifies the handling of traffic classes at network nodes of the label switched path.

In some embodiments the quality of service configuration of the return path of a label switched path specifies the drop handling of traffic classes at network nodes of the label switched path.

In some embodiments the quality of service configuration of the return path of a label switched path specifies the scheduling of traffic classes at network nodes of the label switched path.

In some embodiments the method is implemented in a network node of a Generalised Multi-protocol Label Switching (GMPLS) network.

In accordance with one aspect of the invention, there is provided a computer program product containing processor implementable instructions to carry out a method of the invention.

In accordance with one aspect of the invention there is provided an apparatus for configuring quality of service for a return path of a bi-directional label switched path within a network supporting bi-directional label switched paths having a forward path and a return path. The apparatus comprises a label information store manager, coupled to a label information store, and operable to configure in the label information store a label information context for a quality of service configuration of the return path of a label switched path separately from a quality of service configuration for the forward path. The apparatus also comprises a messaging element coupled to the label information store and operable to form a path set up message containing a return path quality of service object indicating the quality of service configuration for the return path (22) separately from a quality of service configuration for the forward path. The apparatus also comprises a communication element coupled to the messaging element and having an interface with at least one node in the switched path, the communication element being operable to send the path set up message containing the return path quality of service object to the at least one node in the switched path.

In accordance with one aspect of the invention there is provided an apparatus for configuring quality of service for a return path of a bi-directional label switched path within a network supporting bi-directional label switched paths having a forward path and a return path. The apparatus comprises a communication element, having an interface with at least one node in the label switched path, the communication element being operable to receive a path set up message containing a return path quality of service object indicating a quality of service configuration for the return path separately from a quality of service configuration for the forward path. The apparatus also comprises a messaging element coupled to the communication element and operable to determine from the return path quality of service object a quality of service configuration for the return path separately from a quality of service configuration for the forward path. The apparatus also comprises a label information store manager, coupled to the messaging element to receive the determined quality of service configuration of the return path and coupled to a label information store, and operable to configure a label information context for a quality of service configuration of the return path of a label switched path separately from a quality of service configuration for the forward path using receive the determined quality of service configuration of the return path; wherein the communication element is operable to sending a path reservation message corresponding to the received path set up message to a node in the switched path.

In embodiments the apparatus is implemented in a network node of a Generalised Multi-protocol Label Switching (GMPLS) network.

In accordance with some embodiments, there is also provided a network node, comprising apparatus in accordance with embodiments of the invention and a label information store, coupled to the label information store manager, for storing label information contexts for one or more bi-directional label switched paths having a forward path and a return path.

DETAILED DESCRIPTION

Embodiments of the invention provide a method of and apparatus for configuring the quality of service (QoS) for a bi-directional label switched path in a network, and will be described with reference to the accompanying drawings.

Figure 1:
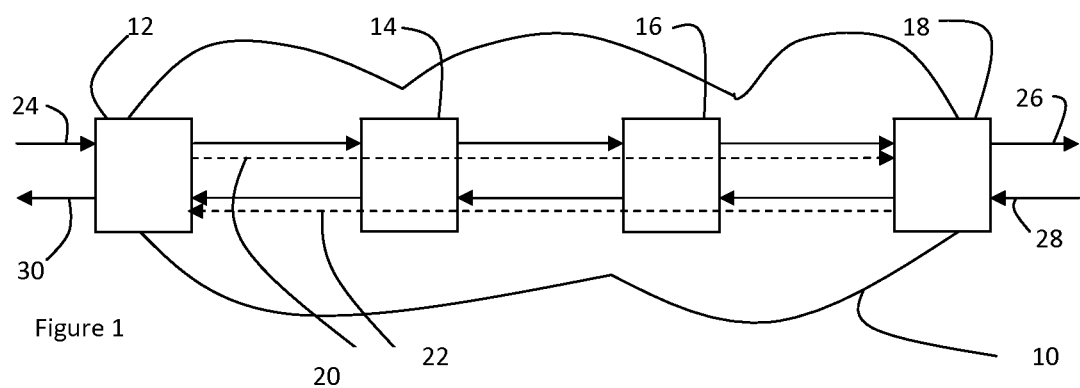
FIG. 1 is a schematic drawing of an exemplary network arrangement showing a bi-directional label switched path.

FIG. 1 is a schematic drawing of a bi-directional label switched path in an exemplary network 10. The exemplary network is a Generalised Multi-protocol Label Switching (GMPLS) network 10.

The network 10 is shown in a simplified schematic form having four exemplary network nodes 12, 14, 16, 18. A label switched path is shown extending between network node 12 and network node 18 via intermediate nodes 14 and 16. The label switched path is a bi-directional label switched path and has a forward path 20 and a return path 22, shown in dashed lines in FIG. 1.

The forward path 20 and the return path 22 shown in dashed lined in FIG. 1 are formed from the individual hops shown as solid arrows between consecutive network nodes 12, 14, 16, 18 in the network 10. Each of the network nodes 12, 14, 16, 18 is provided with label information for the label switched path enabling the network node to handle labelled packets appropriately. The label information at each network node enables the network node to route incoming traffic data on the next hop to the next network node of the label switched path, and to apply the correct labels to outgoing data packets. In addition, as will be discussed in the following description, the label information may enable the network node to apply quality of service (QoS) considerations to labelled packets on the label switched path. The different quality of service considerations may apply different scheduling rules or traffic data drop rules for different classes of traffic data carried on a label switched path.

Thus, traffic data 24 received at the ingress node 12 for the forward path 20 can be transmitted across the network 10 along the forward path 20 of the bi-directional label switched path. The ingress node 12 applies a label to packets containing traffic data 24 and then sends the labelled traffic data packet on a hop to the first intermediate node 14, as shown by the solid arrow connecting the ingress node 12 and the first intermediate node 14.

When the network node 14 receives the labelled traffic data packet from the network node 12, the network node 14 uses its label information for the forward label switch path to route the incoming packets on the next hop to the next network node 16 of the label switched path and to apply the correct labels to outgoing data packets. In addition, the network node 14 may apply quality of service (QoS) considerations determined by the label information to the labelled packets on the label switched path.

When the network node 16 receives the labelled traffic data packet from the network node 14, the network node 16 uses its label information for the forward label switch path to route the incoming packets on the next hop to the next network node 18 of the label switched path, and to apply the correct labels to outgoing data packets. In addition, the network node 16 may apply quality of service (QoS) considerations determined by the label information to the labelled packets on the label switched path.

When the network node 18 receives the labelled traffic data packet from the network node 16, the network node 18 uses its label information to determine the external destination for the output traffic data packet 26. In addition, the network node 18 may apply quality of service (QoS) considerations determined by the label information to the labelled packets received on the forward path 20.

In the same way, traffic data 28 received at the ingress node 18 for the return path 22 can be transmitted across the network 10 along the return path 22 of the bi-directional label switched path. The ingress node 18 applies a label to packets containing traffic data 28 and then sends the labelled traffic data packet on a hop to the first intermediate node 16, as shown by the solid arrow connecting the ingress node 18 and the intermediate node 16.

When the network node 16 receives the labelled traffic data packet from the network node 18, the network node 16 uses its label information for the return label switch path 22 to route the incoming packets on the next hop to the next network node 14, and to apply the correct labels to outgoing data packets. In addition, the network node 16 may apply quality of service (QoS) considerations determined by the label information to the labelled packets on the return path 22.

When the network node 14 receives the labelled traffic data packet from the network node 16, the network node 14 uses its label information for the return path to route the incoming packets on the next hop to the next network node 12 of the return path, and to apply the correct labels to outgoing data packets. In addition, the network node 14 may apply quality of service (QoS) considerations determined by the label information to the labelled packets on the return path 22.

When the network node 12 receives the labelled traffic data packet from the network node 14, the network node 12 uses its label information to determine the external destination for the output traffic data packet 30. In addition, the network node 12 may apply quality of service (QoS) considerations determined by the label information to the labelled packets received on return path 22.

Figure 2:
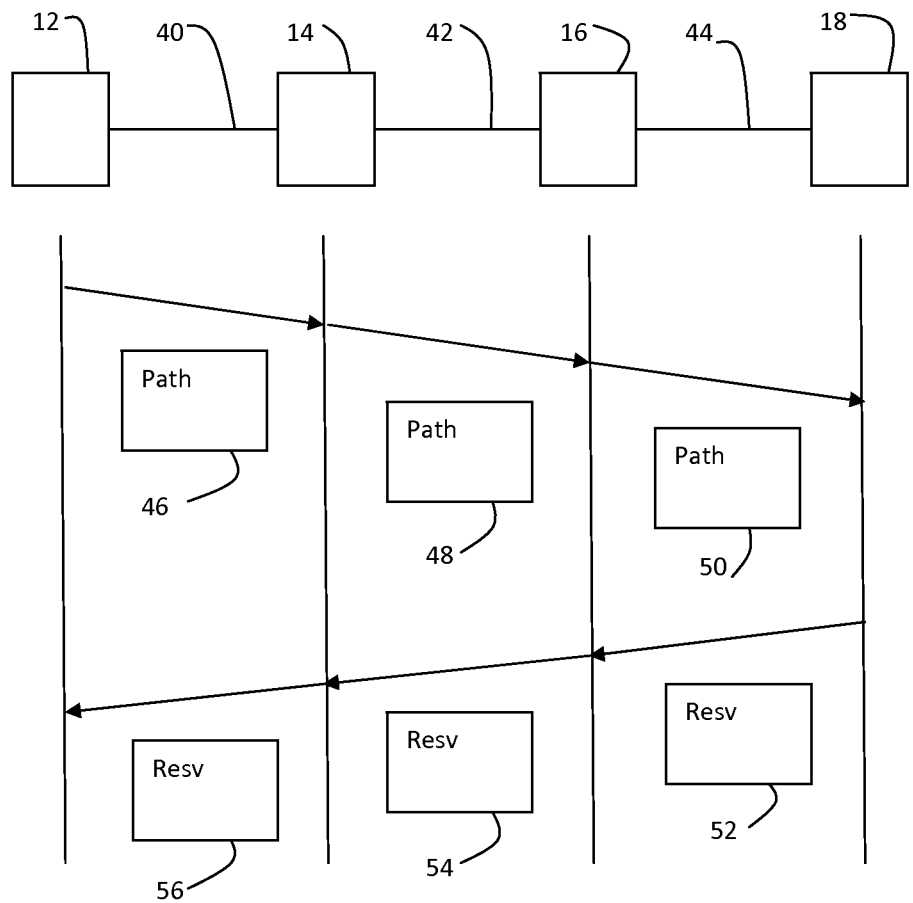
FIG. 2 shows the messages exchanged between network node of the network during the setting up of the label switched path as shown in FIG. 1.

The setting up of a bi-directional label switched path in the exemplary network 10 shown in FIG. 1 will now be described with reference to FIG. 2. FIG. 2 shows the messages exchanged between the network nodes during the setting up of the label switched path as shown in FIG. 1. During the setting up of the bi-directional label switched path, each network node through which the label switched path passes stores label information for the label switched path that enables the network node to correctly handle traffic data being sent along the label switched path.

FIG. 2 shows the exemplary network nodes 12, 14, 16, 18 of the network 10 shown in FIG. 1. The network node 12 is coupled to network node 14 via a control plane interface 40. The network node 14 is coupled to the network node 16 via a bi-directional control plane interface 42. The network node 16 is coupled to network node 18 via a bi-directional control plane interface 44.

The label switched path is set up using messages sent on the control plane interfaces 40, 42, 44 between the network nodes 12, 14, 16, 18. In the exemplary embodiment implemented in a Generalised Multi-protocol Label Switching (GMPLS) network 10, in order to create a new bi-directional label switched path having the forward path 20 and the return path 22 as described above with reference to FIG. 1, the network node 12 creates a provisional label information context for the new label switched path in its label information, and sends a path set up message PATH 46 to the network node 14 on the control interface 40.

The network node 14 receives the path set up message PATH 46 on the control interface 40 and in response the network node 14 creates a provisional label information context for the new label switched path in its label information. The network node 14 then sends a path set up message PATH 48 to the network node 16 on control interface 42.

The network node 16 receives the path set up message PATH 48 on the control interface 42 and in response the network node 16 creates a provisional label information context for the new label switched path in its label information. The network node 16 then sends a path set up message PATH 50 to the network node 18 on control interface 44.

The network node 18 receives the path set up message PATH 50 on the control interface and in response the network node 18 creates a label information context for the new label switched path in its label information. The network node 18 is the final node of the label switched path, and so network node 18 confirms the creation of the label switched path by returning a path reservation message to the network node 12. Thus the network node 18 sends a path reservation message RESV 52 to the network node 16 on control interface 44.

The network node 16 receives the path reservation message RESV 52 from network node 18 on the control interface 44 and in response the network node 16 confirms the provisional label information context for the new label switched path in its label information. The network node 16 then sends a path reservation message RESV 54 to the network node 14 on control interface 42.

The network node 14 receives path reservation message RESV 54 from network node 16 on the control interface 42 and in response the network node 14 confirms the provisional label information context for the new label switched path in its label information. The network node 14 then sends a path reservation message RESV 56 to the network node 14 on control interface 42.

The network node 12 receives the path reservation message RESV 56 from network node 14 on the control interface 40 and in response the network node 12 confirms the provisional label information context for the new label switched path in its label information.

The new bi-directional label switched path is now set up, and each of the network nodes 12, 14, 16, 18 uses the configured label information so that traffic data 24 received at network node 12 can be forwarded along the forward path 20 of the new label switched path, and traffic data 28 received at received at network node 18 can be forwarded along the return path 22 of the new label switched path.

There is an increasing requirement for networks to be able to supply differentiated services by applying different quality of service (QoS) handling criteria to data traffic in different quality of service (QoS) classes being sent along a single label switched path.

In accordance with embodiments of the invention, the label switch path set up messages contain an object specifying or relating to the quality of service (QoS) classes specified for use on the return path 22 of a bi-directional label switched path. In some embodiments the label switch path set up messages also contain an object specifying or relating to the quality of service (QoS) classes specified for use on the forward path 20 of the bi-directional label switched path. In other embodiments default values are used for the quality of service (QoS) classes specified for use on the forward path 20 of the bi-directional label switched path.

Figure 3:
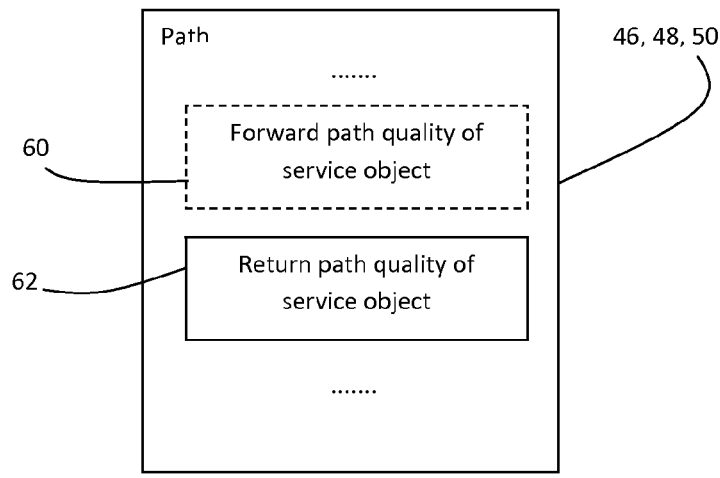
FIG. 3 is an exemplary path set up message in accordance with one embodiment.

FIG. 3 is a schematic illustration of the path set up message PATH 46, 48, 50 in accordance embodiments that include a forward path quality of service (QoS) object 60 relating to the quality of service (QoS) classes for the forward path 20 as well as a return path quality of service (QoS) object 62 relating to the quality of service (QoS) classes for the return path 22. As described above, inclusion of the forward path quality object 60 is not necessary in all embodiments, and so the forward path quality object 60 is shown in dashed lines.

Figure 4:
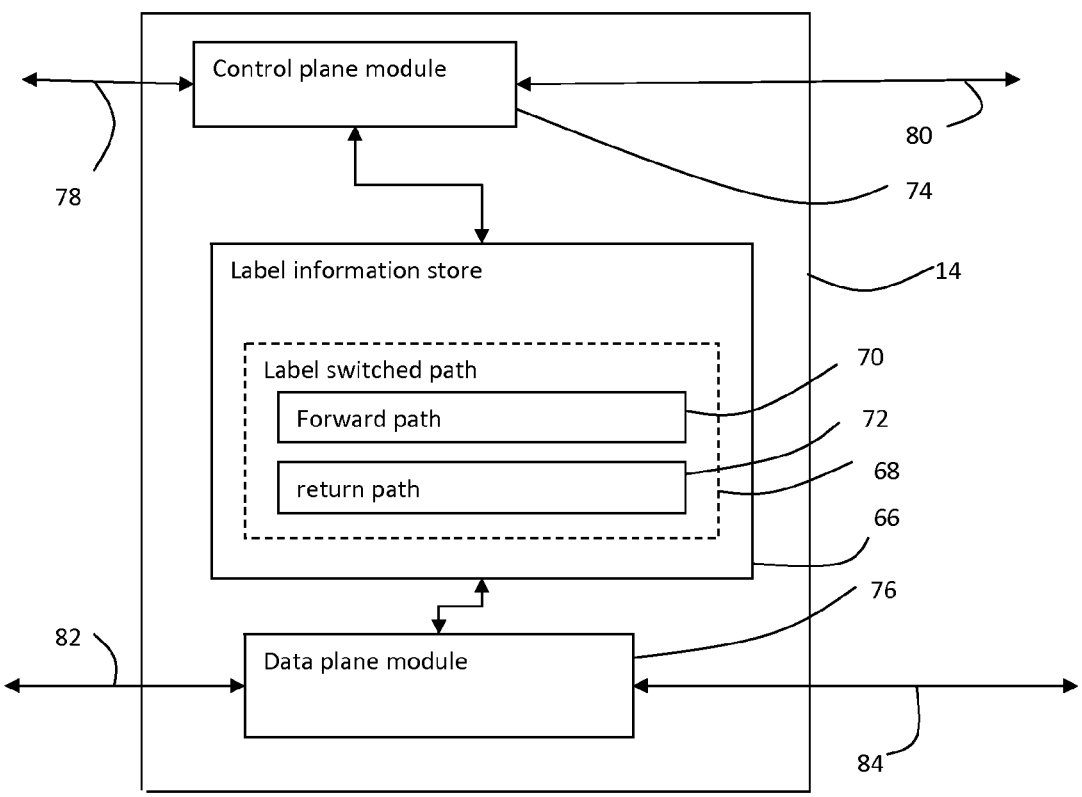
FIG. 4 is a schematic drawing of functional elements in a network node of the exemplary network shown in FIG. 1 or 2.

FIG. 4 is a schematic drawing of functional elements in a representative network node 14 of the exemplary network shown in FIG. 1 or 2. However, the skilled person will appreciate that the same or similar functional elements will be present in all network nodes to enable the network node to configure and then use a label switched path in the network 10.

Representative network node 14 is provided with a label information store 66, in which is stored label switched path information 68 to operate label switched paths. In embodiments, a label information context 70 for a quality of service (QoS) configuration of the forward path 20 of a label switched path is stored in the label information store 66. In addition, a label information context 72 for a quality of service (QoS) configuration of the return path 22 of a label switched path, separate from a quality of service (QoS) configuration for the forward path (20), is stored in the label information store 66.

The representative network node 14 is also provided with a control plane module 74 for performing control plane operations in connection with label switched paths, and a data plane module 76 for performing data plane operations in connection with label switched paths. The control plane module 74 is coupled to adjacent nodes with control plane interfaces 78, 80. The data plane module 76 is coupled to adjacent nodes with data plane interfaces 82, 84.

Figure 5:
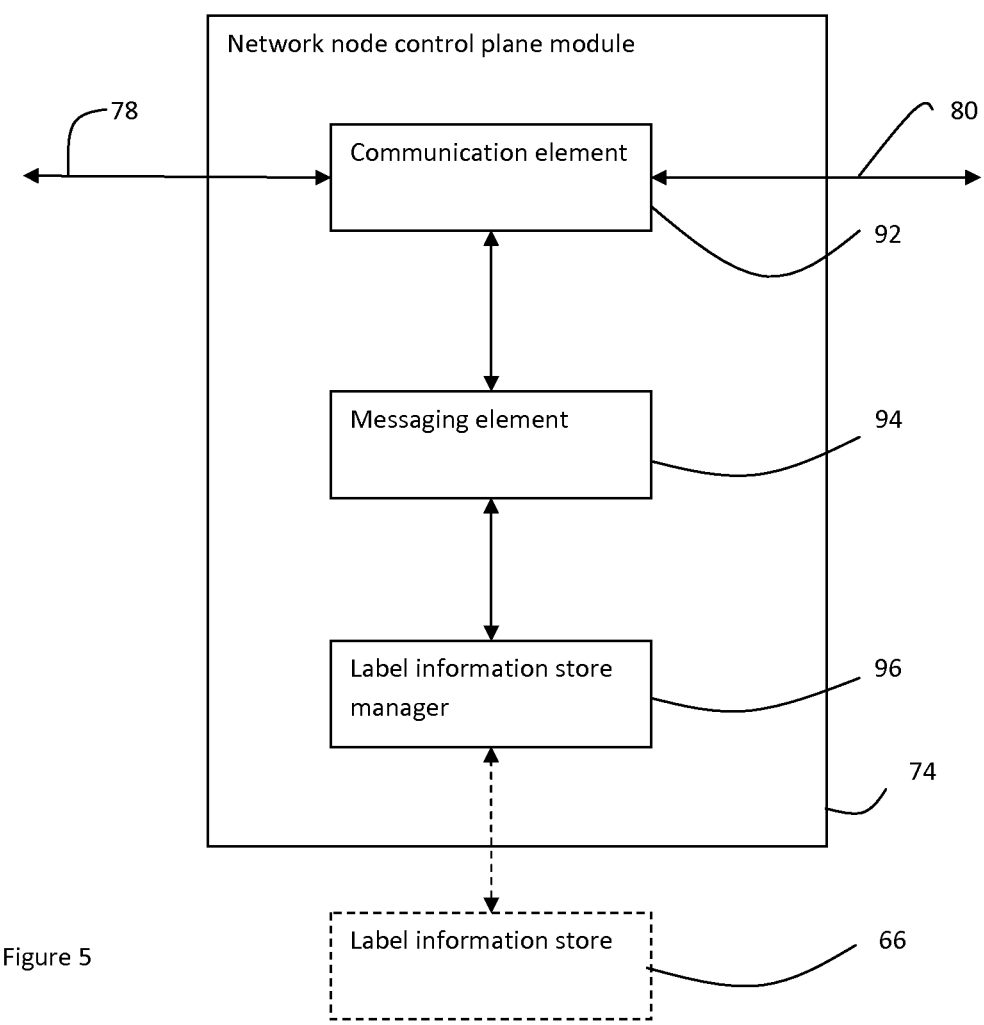
FIG. 5 is a schematic diagram of the functional elements of an exemplary control plane module shown in FIG. 4.

Functional elements of the exemplary embodiment of network node control plane module 74 in accordance with the exemplary embodiment will now be described with reference to FIG. 5. Typically the different functional elements of the network node control plane module 74 might be implemented as a computer program product running on a suitably arranged processor, but the different functional elements of the network node control plane module 74 may be implemented in any appropriate manner available to a skilled person. In addition, although the different functional elements are shown separately, more or fewer functional elements may be used in practical implementations, as will be apparent to a skilled person.

In the exemplary embodiment the control plane module 74 is provided with a communication element 92 having control plane interfaces 78, 80 with adjacent nodes of the network. The communication element 92 is operable to send control plane messages to other network nodes using control plane interfaces 78, 80.

The control plane module 74 is also provided with a messaging element 94 coupled to the communication element 92. The messaging element 94 is operable to form messages relating to label switched paths passing through the network node 74, and to exchange such messages with corresponding messaging elements in adjacent network nodes via communication element 92 and the corresponding communication element in the adjacent network node. The messages may be path set up messages PATH 46, 48, 50 and/or path reservation messages RESV 52, 54, 56. Typically the messages exchanged between the messaging elements of adjacent nodes of a label switched path enable the label switched path to be set up and maintained.

The control plane module 74 is also provided with a label information store manager 96 coupled to a label information store 66. The label information store manager 96 is operable to manage label information, relating to label switched paths, in the label information store 66. The label information store manager 96 is coupled to the messaging element 94 to receive label information relating to a label switched path for storing in the label information store and to provide label information relating to a label switched path to the messaging element 94, as necessary. In particular, in embodiments the label information store manager 96 stores a label information context 72 for a quality of service (QoS) configuration of the return path 22 of a label switched path separately from a quality of service (QoS) configuration for the forward path 20.

Figure 6:
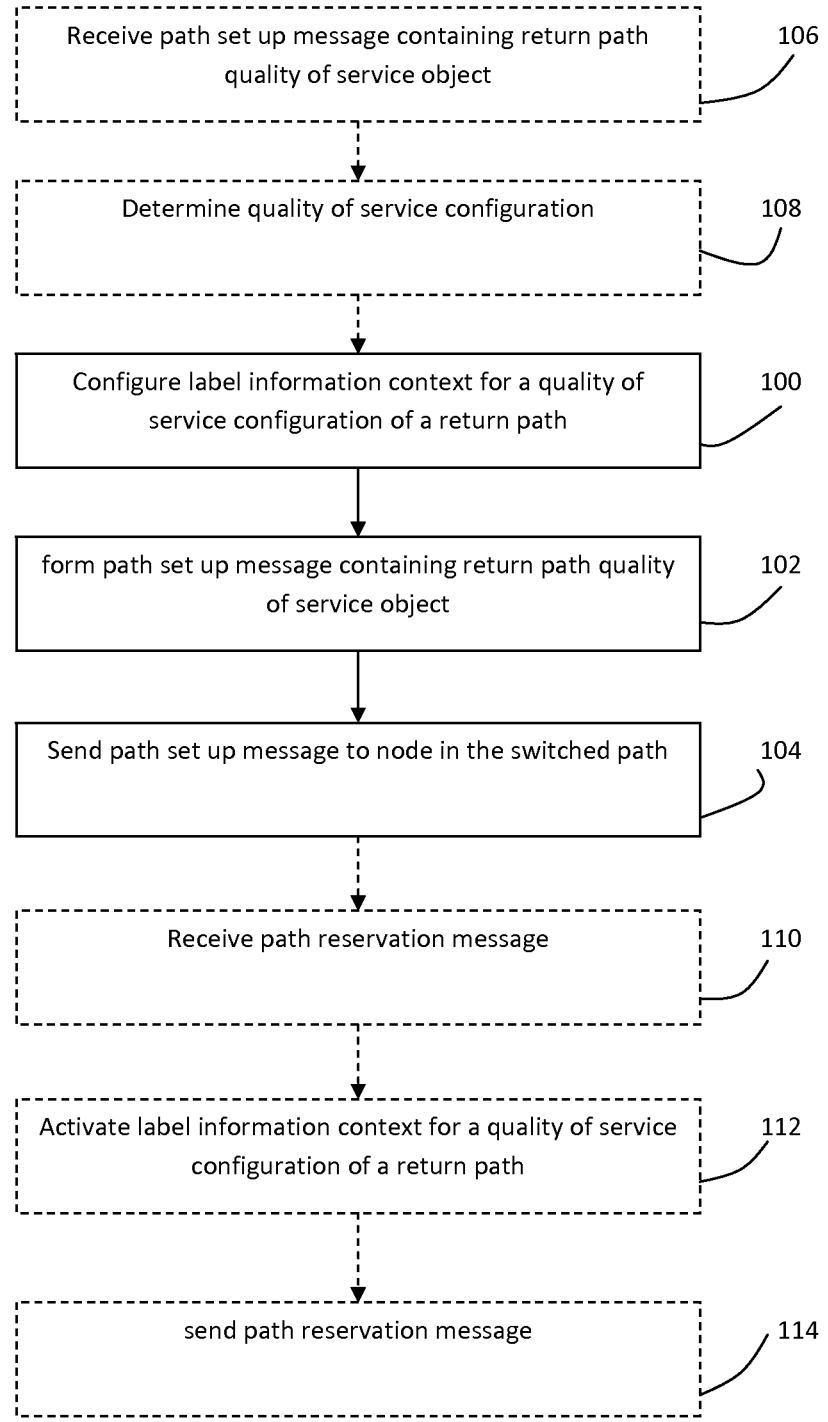
FIG. 6 is a flowchart showing a method in accordance with embodiments of the invention.
Figure 7:
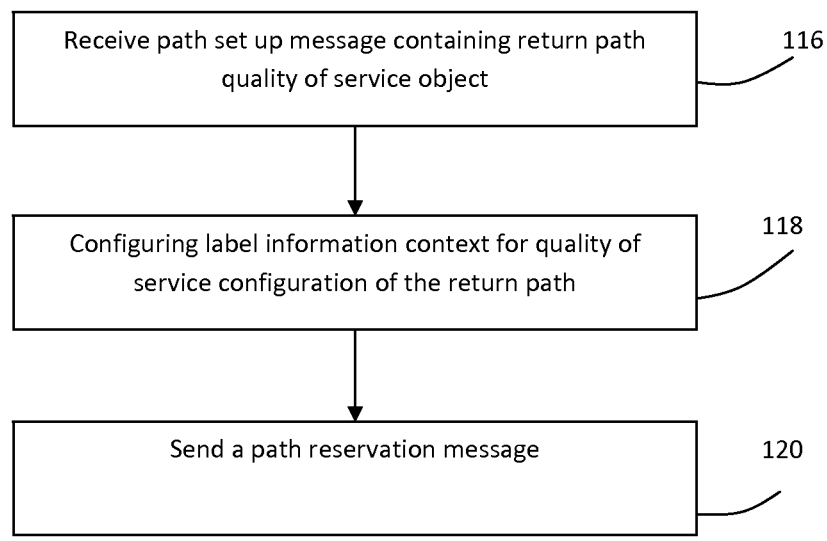
FIG. 7 is a flowchart showing a method in accordance with embodiments of the invention.

A method of configuring the quality of service (QoS) for a return path of a bi-directional label switched path in accordance with embodiments of the invention will now be described with reference to FIGS. 6 and 7. FIG. 6 shows steps carried out by an originating network node and intermediate network nodes for a label switched path, and FIG. 7 shows steps carried out by a terminating network node for a label switched path. However, it will be appreciated that the same network node may act as the originating node for a first label switched path, the terminating network node for a second label switched path and as an intermediate network node for a third label switched path.

FIG. 6 is a flowchart showing steps in a method in accordance with embodiments of the invention. Not all steps shown in FIG. 6 are carried out at one time by all nodes of the network, and so some of the steps have been shown using dashed lines.

In a step 100 of FIG. 6, a label information context for a quality of service (QoS) configuration of a return path of a bi-directional label switched path is configured. Typically in the exemplary embodiment of the network node 10 shown in FIGS. 4 and 5, this step is carried out by the label information store manager 96 in response to the messaging element 94.

In a step 102 of FIG. 6 a path set up message containing a return path quality of service (QoS) object is formed. In the exemplary embodiment of the network node 10 shown in FIGS. 4 and 5, this step is carried out by the messaging element 94.

In step 104 of FIG. 6 a path set up message is sent to another network node in the label switched path. In the exemplary embodiment of the network node 10 shown in FIGS. 4 and 5, this step is carried out by the communication element 92.

In intermediate nodes of a label switched path, the configuration of the label information context carried out in step 100 is carried out in response to the receipt of a path set up message from the originating node of the label switched path or from another intermediate node of the label switched path.

Therefore, in some embodiments, in an initial step 106 shown in FIG. 6, a path set up message containing a return path quality of service (QoS) object is received. In the exemplary embodiment of the network node 10 shown in FIGS. 4 and 5, the communication element receives the path set up message containing a return path quality of service (QoS) object In initial step 108 shown in FIG. 6, the quality of service (QoS) configuration for the return path of the bi-directional label switched path is determined from the quality of service (QoS) object received in the path set up message. In the exemplary embodiment of the network node 10 shown in FIGS. 4 and 5, this step is carried out by the messaging element 94. The label information context for the quality of service (QoS) configuration for the return path determined by the messaging element can then be configured as discussed above.

In some embodiments, such as the exemplary embodiment implemented in a Generalised Multi-protocol Label Switching (GMPLS) network 10, a label switched path is activated in response to the receipt of a path reservation message.

Therefore in some embodiments, in step 110 shown in FIG. 6 a path reservation message, corresponding to a path set up message already received, is received. In the exemplary embodiment of the network node 10 shown in FIGS. 4 and 5, the communication element 92 receives the path reservation message from an adjacent network node.

In response to the receipt of the path reservation message, the label information for that label switched path, including the label information context for a quality of service configuration for the return path, is activated.

In such embodiments, at intermediate nodes, a path reservation message is sent to the next network node of the label switched path in order to activate the label switched path. Once the originating node receives the path reservation message, in step 110 and activated the label information, the label switched path is activated at all network nodes and there is need to send a path reservation message in step 114.

FIG. 7 is a flowchart showing steps carried out by a terminating network node for a label switched path in accordance with an exemplary embodiment.

In step 116 of FIG. 7, a path set up message containing a return path quality of service (QoS) object is received.

In step 118 of FIG. 7, a label information context for a quality of service (QoS) configuration of the return path is configured. In the exemplary embodiment the label information store manager 96 configures the label information context for a quality of service (QoS) configuration of the return path in the label information store 66.

In step 120 of FIG. 7, a path reservation message is sent.

In the exemplary embodiment the network 10 is a Generalised Multi-protocol Label Switching (GMPLS) network 10. The setup of a QoS-asymmetric bidirectional LSP is signalled using the bidirectional procedures defined in Internet Engineering Task Force (IETF) Request for Comments [RFC3473], the extensions in support of Differentiated Services in MPLS networks defined in Internet Engineering Task Force (IETF) Request for Comments [RFC 3270] together with the inclusion of a new UPSTREAM_DIFFSERV object. Thus, in the Generalised Multi-protocol Label Switching (GMPLS) network 10 of the exemplary embodiment, the forward path quality object 60 of FIG. 3 is a DIFFSERV object 60 and the return path quality object 62 of FIG. 3 is an UPSTREAM_DIFFSERV object 62.

The format of the path set up message PATH 46, 48, 50 in the exemplary embodiment in a Generalised Multi-protocol Label Switching (GMPLS) network 10 is as follows:

```
<Path Message> ::= <Common Header> [ <INTEGRITY> ]
    <SESSION> <RSVP_HOP>
    <TIME_VALUES>
    [ <EXPLICIT_ROUTE> ]
    <LABEL_REQUEST>
    [ <SESSION_ATTRIBUTE> ]
    [ <DIFFSERV> ]
    [ <UPSTREAM_DIFFSERV> ]
    [ <POLICY_DATA> ... ]
    [ <sender descriptor> ]
<sender descriptor> ::= <SENDER_TEMPLATE> <SENDER_TSPEC>
```

```
    [ <ADSPEC> ]
    [ <RECORD_ROUTE> ]
```

The form of a PATH message in a Generalised Multi-protocol Label Switching (GMPLS) network 10 will be familiar to a skilled person from the Internet Engineering Task Force (IETF) documents referred to above and related documents, and therefore the form of the PATH message in embodiments implemented in a Generalised Multi-protocol Label Switching (GMPLS) network 10 will not be discussed in more detail herein.

As will be familiar to a skilled person, the elements in square brackets are optional within the standard path message. However embodiments of the invention implemented in a Generalised Multi-protocol Label Switching (GMPLS) network 10 contain at least an UPSTREAM_DIFFSERV object 62.

Figure 8:
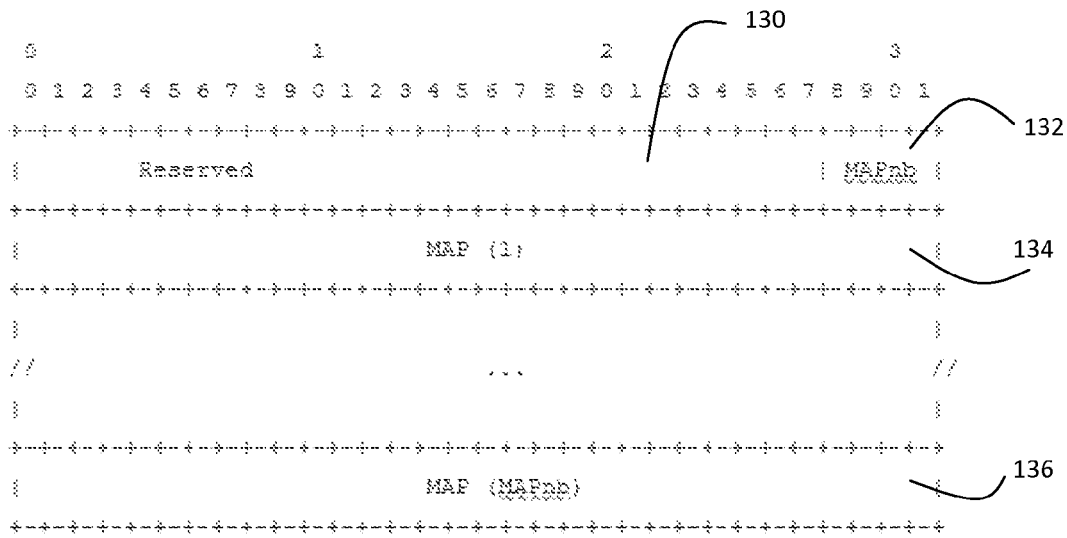
FIG. 8 shows the contents of an object in the exemplary path set up message shown in FIG. 3 in accordance with an embodiment.

FIG. 8 shows the contents of UPSTREAM_DIFFSERV object 62 in the exemplary path set up message shown in FIG. 3 in accordance with an embodiment of the invention implemented in a Generalised Multi-protocol Label Switching (GMPLS) network 10. This exemplary UPSTREAM_DIFFSERV object 62 may be used during the setting up of an E-LSP label switched path.

The upstream object UPSTREAM_DIFFSERV object 62 carries the same information and is used in support of Differentiated Services in the return path, or upstream direction in MPLS networks in the same way as the DIFFSERV object that is used in support of Differentiated Services in the forward path or downstream direction in MPLS networks, as defined in Internet Engineering Task Force (IETF) Request for Comments [RFC 3270].

One example of a UPSTREAM_DIFFSERV object 62 is shown in FIG. 8, having a reserved field 130; a MAPnb field 132; and one or more MAP fields 134, 136. In the exemplary UPSTREAM_DIFFSERV object 62 shown in FIG. 8, there are n MAP fields, of which only the first MAP(1) field 134 and the last MAP(n) field 136 are shown explicitly.

The reserved field 130 in the exemplary embodiment is 28 bits long. All bits in the reserved field 130 are set to zero on transmission and are ignored on receipt.

The MAPnb field 132 in the exemplary embodiment is 4 bits long, and indicates the number of MAP entries that are included in the UPSTREAM_DIFFSERV object 62. A different MAP entry is included for each separate quality of service (QoS) priority management class to be supported by the label switched path.

Each MAP field 134, 136 in the exemplary embodiment is 32 bits long and defines the mapping between an experimental (EXP) field value and a per hop behaviour.

The different per hop behaviour associated with different EXP field values enables a differentiated service to be provided to traffic data in different classes on the same label switched path. The per hop behaviour defined for the different EXP values may include behaviour governed by quality of service considerations, and therefore the mapping between the EXP field values and the per hop behaviour may provide a quality of service configuration in some embodiments. For example the quality of service configuration associated with different EXP values/per hop behaviour mappings may define different scheduling priorities at the network nodes, or may define different traffic data drop conditions in situations where the network node is congested.

Figure 9:
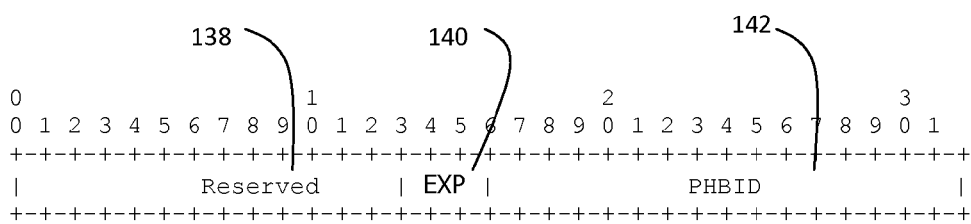
FIG. 9 shows part of the object shown in FIG. 7 in accordance with an embodiment.

Specifically, FIG. 9 shows an exemplary format of the MAP field 134, 136 shown in FIG. 7 in accordance with an embodiment. As indicated above, an exemplary MAP entry 134 comprises a reserved field 138; and EXP field 140 and a per hop behaviour identification (PHBID) 142.

The reserved field 138 of the MAP entry is 13 bits long in the exemplary embodiment. This field is set to zero on transmission, and is ignored on receipt.

The EXP field 140 is 3 bits long, and contains the value of the EXP field for the EXP→per hop behaviour mapping that is defined by the MAP entry.

The PHBID field is 16 bits long and contains the per hop behaviour identification (PHBID) corresponding to the per hop behaviour for the EXP→per hop behaviour mapping that is defined by the MAP entry.

Figure 10:
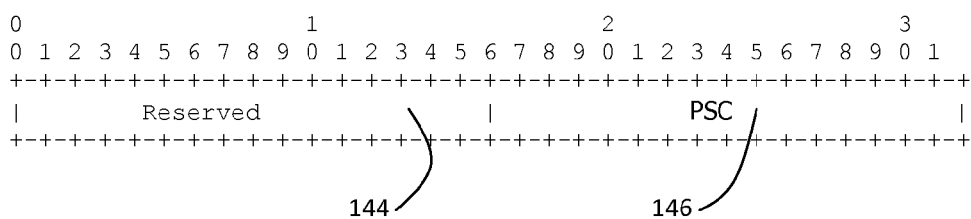
FIG. 10 shows the contents of an object in the exemplary path set up message shown in FIG. 3 in accordance with an embodiment.

FIG. 10 shows the contents of UPSTREAM_DIFFSERV object 62 in the exemplary path set up message shown in FIG. 3 in accordance with an embodiment of the invention implemented in a Generalised Multi-protocol Label Switching (GMPLS) network 10. This exemplary UPSTREAM_DIFFSERV object 62 may be used during the setting up of an L-LSP label switched path.

One example of a UPSTREAM_DIFFSERV object 62 is shown in FIG. 10, having a reserved field 144; and a per hop behaviour (PHB) scheduling class PSC field 146.

This label switched path has only a single per-hop behaviour associated with it. The per hop behaviour defined in the PSC field 146 may include behaviour governed by quality of service considerations, and therefore the per hop behaviour defined by the PSC field 146 provides a quality of service configuration in some embodiments. For example the quality of service configuration associated with the per hop behaviour defined by the PSC field 146 may define different scheduling priorities at the network nodes, or may define different traffic data drop conditions in situations where the network node is congested.

The reserved field 144 in the exemplary embodiment is 16 bits long. This field is set to zero on transmission, and is ignored on receipt.

The per hop behaviour (PHB) scheduling class PSC field 146 indicates a per hop behaviour scheduling class supported by the label switched path, as will be known to a skilled person.

Figure 11:
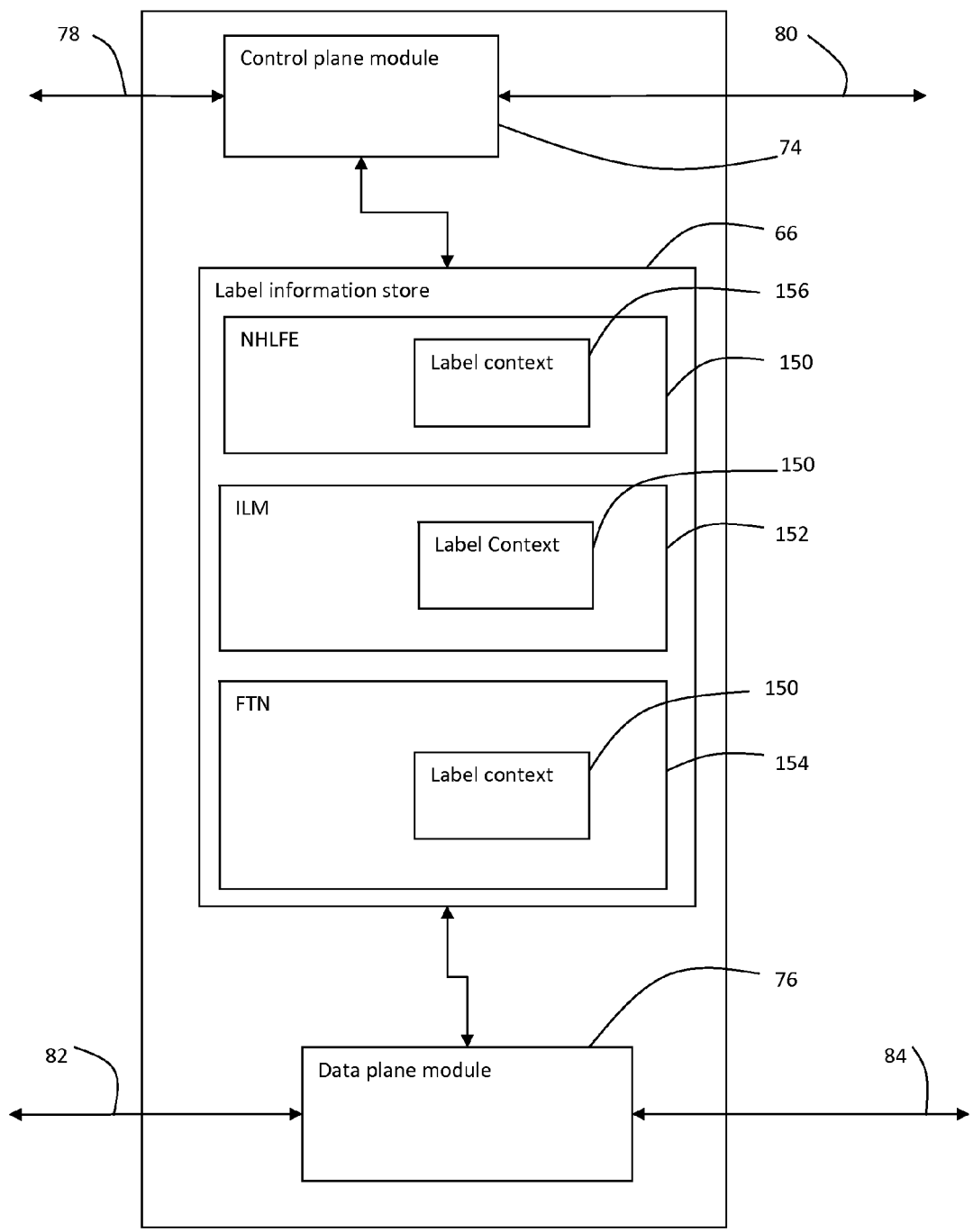
FIG. 11 is a more detailed schematic drawing of functional elements in a network node of the exemplary network shown in FIG. 1 or 2 in accordance with an embodiment.

FIG. 11 is a more detailed schematic drawing of functional elements in a network node of the exemplary network shown in FIG. 1 or 2 in a Generalised Multi-protocol Label Switching (GMPLS) network 10. FIG. 11 corresponds with FIG. 4 and therefore elements having the same or similar function have been given the same reference numerals.

In the embodiment shown in FIG. 11, the label information store comprises a Next Hop Label Forwarding Entry (NHLFE) table 150; an Incoming Label Map (ILM) 152 and forwarding equivalency class (FEC) to Next Hop Label Forwarding Entry (NHLFE) map (FTN) 154.

The Next Hop Label Forwarding Entry (NHLFE) table 150; a Incoming Label Map (ILM) 152 and forwarding equivalency class (FEC) to Next Hop Label Forwarding Entry (NHLFE) map (FTN) 154 are typically implemented in a database, but may be implemented in other ways in accordance with different embodiments of the invention, as will be apparent to a skilled person.

A label information context for a label comprises:
The label switched path type, i.e. whether the label relates to an E-LSP or to an L-LSP;
The per hop behaviours (PHBs) supported by the label, which specifies quality of service parameters such as scheduling and drop handling of traffic data;
The experimental (EXP) to per hop behaviour (PHB) mapping for an incoming label; and
The per hop behaviour (PHB) to experimental (EXP) mappings for an outgoing label.

The label forwarding context is stored in the Incoming Label Map (ILM) 152 for each incoming label and in the FTN 154 and in the Next Hop Label Forwarding Entry (NHLFE) 150 for each outgoing label at label establishment time i.e. during setting up of the label switched path.

Thus, when the label request and the different differential service treatments are accepted and labels (both downstream and upstream) are allocated, the label switched routers (LSR) at the sender, destination, and intermediate network nodes perform the following actions:
update the label forwarding contexts associated with both downstream and upstream directions of the label switched path LSP in their Incoming Label Map (ILM) 152 and the FEC- to NHLFE map FTN 154 as specified in the Internet Engineering Task Force (IETF) Request for Comments [RFC3270]; and
install the required differential service forwarding treatments (scheduling and dropping behavior) for these Next Hop Label Forwarding Entry (NHLFE) 150 (outgoing label for both forward path downstream direction and the return path upstream direction).

Thus in embodiments of the invention:
a label information context 156 for a label used in a return path of a bi-directional label switched path is stored in the Next Hop Label Forwarding Entry (NHLFE) 150 table;
a label information context 158 for a label used in a return path of a bi-directional label switched path is stored in a Incoming Label Map (ILM) 152; and
a label information context 160 for a label used in a return path of a bi-directional label switched path is stored in forwarding equivalency class (FEC) to Next Hop Label Forwarding Entry (NHLFE) map (FTN) 154.

An embodiment of the invention implemented in a Generalised Multi-protocol Label Switching (GMPLS) network 10 as described above may be used to establish bi-directional label paths in which the return path quality of service (QoS) may be specified separately from the forward path quality of service (QoS).

In a first example, in order to create an asymmetric bidirectional label switched path EXP-inferred label switched path E-LSP with the resource reservation protocol RSVP, which uses separately signaled 'EXP<-->PHB mappings' for each of the forward and the return paths, the sender network node creates a Path message:
with the LABEL_REQUEST object,
with the UPSTREAM_LABEL object,
with the DIFFSERV object for an E-LSP containing one MAP entry for each EXP value to be supported on the downstream direction of this E-LSP,
with the UPSTREAM_DIFFSERV object for an E-LSP containing one MAP entry for each EXP value to be supported on the upstream direction of this E-LSP.

In a second example, in order to establish an asymmetric bidirectional label switched path E-LSP with the resource reservation protocol RSVP, which uses the preconfigured 'EXP<-->PHB mapping' for the downstream direction and a signaled 'EXP<-->PHB mapping' for the upstream direction, the sender network node creates a Path message:
with the LABEL_REQUEST object,
with the UPSTREAM_LABEL object,
without the DIFFSERV object, with the UPSTREAM_DIFFSERV object for an E-LSP containing one MAP entry for each EXP value to be supported on the upstream direction of this E-LSP.

In a third example, in order to establish an asymmetric bidirectional label switched path E-LSP with the resource reservation protocol RSVP, which uses the preconfigured 'EXP<-->PHB mapping' for the downstream direction and a signaled 'EXP<-->PHB mapping' for the upstream direction, the sender network node may alternatively create a Path message:
- with the LABEL_REQUEST object,
- with the UPSTREAM_LABEL object,
- with the DIFFSERV object containing no MAP entries (MAPnb=0),
- with the UPSTREAM_DIFFSERV object for an E-LSP containing one MAP entry for each EXP value to be supported on the upstream direction of this E-LSP.

In a fourth example, in order to establish an asymmetric bidirectional label switched path E-LSP with the resource reservation protocol RSVP, which uses the signaled 'EXP<-->PHB mapping' for the downstream direction and the preconfigured 'EXP<-->PHB mapping' for the upstream direction, the sender network node creates a Path message:
- with the LABEL_REQUEST object,
- with the UPSTREAM_LABEL object,
- with the DIFFSERV object for an E-LSP containing one MAP entry for each EXP value to be supported on the downstream direction of this E-LSP,
- with the UPSTREAM_DIFFSERV object containing no MAP entries (MAPnb=0).

It should be noted that it is not possible to establish an asymmetric bidirectional label switched path E-LSP with the resource reservation protocol RSVP, which uses the signaled 'EXP<-->PHB mapping' for the downstream direction and the preconfigured 'EXP<-->PHB mapping' for the upstream direction without the explicit use of a dummy (i.e. containing zero MAP entries) UPSTREAM_DIFFSERV object as shown in the fourth example.

In a fifth example, in order to establish a symmetric bidirectional label switched path E-LSP with the resource reservation protocol RSVP, which uses the preconfigured 'EXP<-->PHB mapping' for the downstream as well as for the upstream direction, the sender network node may create a Path message in accordance to Section 5.3 of the Internet Engineering Task Force (IETF) Request for Comments [RFC3270]. The sender network node may alternatively create a Path message:
- with the LABEL_REQUEST object,
- with the UPSTREAM_LABEL object,
- with the DIFFSERV object containing no MAP entries (MAPnb=0),
- with the UPSTREAM_DIFFSERV object containing no MAP entries (MAPnb=0).

In a sixth example, in order to establish a symmetric bidirectional label switched path E-LSP with the resource reservation protocol RSVP, which uses the preconfigured 'EXP<-->PHB mapping' for the downstream as well as for the upstream direction, the sender network node may create a Path message
- with the LABEL_REQUEST object,
- with the UPSTREAM_LABEL object,
- without the DIFFSERV object containing no MAP entries (MAPnb=0),
- with the UPSTREAM_DIFFSERV object containing no MAP entries (MAPnb=0).

In a seventh example, in order to establish a quality of service (QoS)-asymmetric bidirectional label switched path L-LSP with the resource reservation protocol RSVP, the sender network node creates a Path message:
- with the LABEL_REQUEST object,
- with the UPSTREAM_LABEL object,
- with the DIFFSERV object for an L-LSP containing the PHB Scheduling Class (PSC) supported on the downstream direction of this L-LSP,
- with the UPSTREAM_DIFFSERV object for an L-LSP containing the PHB Scheduling Class (PSC) supported on the upstream direction of this L-LSP.

In some embodiments it is possible to establish a bidirectional LSP that has a "hybrid" label switched path, for example, it may behave as an E-LSP in the downstream direction and as an L-LSP in the upstream direction (or vice versa).

A label switched router (LSR) that recognizes the UPSTREAM_DIFFSERV object and that receives a path message which contains the UPSTREAM_DIFFSERV object but which does not contain a LABEL_REQUEST and an UPSTREAM_LABEL object sends a PathErr towards the sender with the error code 'DiffServ Error' and an error value of 'Unexpected UPSTREAM_DIFFSERV object' (the value of the 'Diff-Serv Error' error code is 27 in accordance to the Internet Engineering Task Force (IETF) Request for Comments [RFC3270] and the error value of 'Unexpected UPSTREAM_DIFFSERV object' is 6).

A label switched router (LSR) receiving a Path message with the UPSTREAM_DIFFSERV object for E-LSP, which recognizes the UPSTREAM_DIFFSERV object but does not support the particular PHB encoded in one, or more, of the MAP entries, sends a PathErr message towards the sender network node with the error code 'DiffServ Error' and an error value of 'Unsupported upstream PHB' (i.e. 7).

A label switched router (LSR) receiving a Path message with the UPSTREAM_DIFFSERV object for E-LSP, which recognizes the UPSTREAM_DIFFSERV object but determines that the signaled 'EXP<-->PHB mapping' is invalid in accordance with the Internet Engineering Task Force (IETF) Request for Comments [RFC3270], sends a PathErr towards the sender network node with the error code 'DiffServ Error' and an error value of 'Invalid upstream EXP<-->PHB mapping' (i.e. 8).

A label switched router (LSR) receiving a Path message with the UPSTREAM_DIFFSERV object for L-LSP, which recognizes the UPSTREAM_DIFFSERV object but does not support the particular PSC encoded in the PSC field, sends a PathErr message towards the sender network node with the error code 'DiffServ Error' and an error value of 'Unsupported upstream PSC' (i.e. 9).

A label switched router (LSR) receiving a Path message with the UPSTREAM_DIFFSERV object, which recognizes the UPSTREAM_DIFFSERV object but that is unable to allocate the required upstream per-LSP DiffServ context sends a PathErr with the error code 'DiffServ Error' and the error value 'Per-LSP upstream context allocation failure' (i.e 10).

A label switched router (LSR) that does not recognize the UPSTREAM_DIFFSERV object Class-Num will behave in accordance with the procedures specified in the Internet Engineering Task Force (IETF) Request for Comments [RFC2205] for an unknown Class-Num whose format is 0bbbbbbb. In this case, a PathErr message with the error code 'Unknown object class' is sent toward the sender network node.

A label switched router (LSR) that recognizes the UPSTREAM_DIFFSERV object Class-Num but does not recognize the UPSTREAM_DIFFSERV object C-Type, must behave in accordance with the procedures specified in the Internet Engineering Task Force (IETF) Request for Comments [RFC2205] for an unknown C-type. In this case, a PathErr message with the error code 'Unknown object C-Type' is sent toward the sender network node.

Once the bi-directional label switched path has been set up as described above, the respective data plane module for a network node uses the stored label information context information to forward data traffic correctly along the label switched path, and to apply quality of service configurations specified for the forward path and separately for the return path to the data traffic.

a Generalised Multi-protocol Label Switching (GMPLS) network 10 In order to establish a bidirectional path with a specified quality of service (QoS) treatment of the return path, without this invention, it is necessary to establish two independent unidirectional LSPs and assign each of them the respective required quality of service (QoS) treatment. This approach requires a complicated and distributed route computation and greater set up time latency and control plane and management plane overhead than is required for embodiments of the invention.

Embodiments of the invention allow the creation of bidirectional LSPs with specified quality of service (QoS) for forward and return directions via the control plane. The configuration of any type of parameter via control plane instead of via the management plane enables savings to be made in operational expenditure (OPEX).

Therefore it can be seen that embodiments of the invention enable a bidirectional label switched path (LSP) with quality of service (QoS) treatment in the upstream direction being specified separately from the downstream direction to be set up using control plane signaling.

Embodiments may be used in a plurality of network types exemplified by but not limited to: Time Division Multiplex (TDM) networks; and multi-protocol label switching/multi-protocol label switching transport profile (MPLS/MPLS-TP) networks. In some embodiments an extension to the resource reservation protocol-traffic engineering (RSVP-TE) signaling protocol is defined that enables a bidirectional Label Switched Path (LSP) to be set up with quality of service (QoS) treatment of traffic in the upstream direction specified separately from the quality of service (QoS) treatment of traffic in the downstream direction.

The invention claimed is:

1. A method of configuring quality of service for a return path of a bi-directional label switched path within a network, the bi-directional label switched path having a forward path and the return path, the method comprising:
   configuring, by a node, a label information context for a quality of service configuration of the return path of the bi-directional label switched path separate from a quality of service configuration for the forward path, the node being in the in the bi-directional label switched path;
   forming, by the node, a path set up message comprising a return path quality of service object indicating the quality of service configuration for the return path separately from the quality of service configuration for the forward path; and
   sending, by the node, the path set up message comprising the return path quality of service object to a next node in the bi-directional label switched path,
   wherein the path set up message enables a plurality of quality of service classes to be supported by the bi-directional label switched path, and
   wherein the path set up message defines a mapping for the forward path between each quality of service class and a quality of service treatment and a separately specified mapping for the return path between each quality of service class and a quality of service treatment, such that a forward direction quality of service treatment of the plurality of quality of service classes on the forward path is specified separately from a return direction quality of service treatment of the plurality of quality of service classes on the return path.

2. The method as claimed in claim 1, further comprising:
   receiving, by the node, a path set up message from a previous node in the bi-directional labeled switched path, the path set up message comprising the return path quality of service object indicating the quality of service configuration for the return path; and
   determining, by the node, the quality of service configuration of the return path indicated by the received return path quality of service object,
   wherein the determined quality of service configuration of the return path is used in the step of configuring the label information context.

3. The method as claimed in claim 1, further comprising:
   receiving, by the node, a path reservation message from the next node in the bi-directional label switched path, the path reservation message corresponding to a previously handled path set up message; and
   activating, by the node, the corresponding configured label information context for the quality of service configuration of the return path.

4. The method as claimed in claim 3, further comprising:
   sending, by the node, a path reservation message corresponding to the received path reservation message to a previous node in the bi-directional label switched path.

5. A method of configuring quality of service for a return path of a bi-directional label switched path within a network, the bi-directional label switched path having a forward path and the return path, the method comprising:
   receiving, by a node, a path set up message comprising a return path quality of service object indicating a quality of service configuration for the return path separately from a quality of service configuration for the forward path, the node being a terminating node in the in the bi-directional label switched path;
   configuring, by the node, a label information context for a quality of service configuration of the return path of a label switched path using the quality of service configuration of the return path indicated by the received return path quality of service object; and
   sending, by the node, a path reservation message corresponding to the received path set up message to a previous node in the bi-directional label switched path,
   wherein the path set up message enables a plurality of quality of service classes to be supported by the bi-directional label switched path, and
   wherein the path set up message defines a mapping for the forward path between each quality of service class and a quality of service treatment and a separately specified mapping for the return path between each quality of service class and a quality of service treatment, such that a forward direction quality of service treatment of the plurality of quality of service classes on the forward path is specified separately from a return direction quality of service treatment of the plurality of quality of service classes on the return path.

6. The method as claimed in claim 1, wherein the path set up message also includes a forward path quality of service object indicating a quality of service configuration for the forward path, the method further comprising:
configuring, by the node, a label information context for the quality of service configuration of the forward path indicated by the forward path quality of service object, the node being in the in the bi-directional label switched path.

7. The method as claimed in claim 1, wherein the quality of service configuration of the return path of the label switched path specifies handling of traffic data at network nodes of the bi-directional label switched path.

8. The method as claimed in claim 7, wherein the quality of service configuration of the return path of the label switched path specifies congestion drop handling of traffic data at network nodes of the label switched path.

9. The method as claimed in claim 7, wherein the quality of service configuration of the return path of the label switched path specifies scheduling of traffic data at network nodes of the label switched path.

10. The method as claimed in claim 1, wherein the method is implemented in a network node of a Generalised Multi-protocol Label Switching (GMPLS) network.

11. A computer program product comprising processor implementable non-transitory instructions to carry out a method as claimed in claim 1.

12. An apparatus for configuring quality of service for a return path of a bi-directional label switched path within a network supporting bi-directional label switched paths, the bi-directional label switched path having a forward path and a return path, the apparatus comprising:
a label information store manager, coupled to a label information store, and operable to configure in the label information store a label information context for a quality of service configuration of the return path of the bi-directional label switched path separately from a quality of service configuration for the forward path, the apparatus being a part of a node in the bi-directional label switch path;
a messaging element coupled to the label information store and operable to form a path set up message comprising a return path quality of service object indicating the quality of service configuration for the return path separately from the quality of service configuration for the forward path; and
a communication element coupled to the messaging element and having an interface with at least one next node in the bi-directional label switched path, the communication element being operable to send the path set up message comprising the return path quality of service object to the at least one next node in the bi-directional label switched path,
wherein the path set up message enables a plurality of quality of service classes to be supported by the bi-directional label switched path, and
wherein the path set up message defines a mapping for the forward path between each quality of service class and a quality of service treatment and a separately specified mapping for the return path between each quality of service class and a quality of service treatment, such that a forward direction quality of service treatment of the plurality of quality of service classes on the forward path is specified separately from a return direction quality of service treatment of the plurality of quality of service classes on the return path.

13. An apparatus for configuring quality of service for a return path of a bi-directional label switched path within a network supporting bi-directional label switched paths, the bi-directional label switched path having a forward path and the return path, the apparatus comprising:
a communication element, having an interface with at least one previous node in the bi-directional label switched path, the communication element being operable to receive a path set up message comprising a return path quality of service object indicating a quality of service configuration for the return path separately from a quality of service configuration for the forward path, the apparatus being a part of a terminating node in the bi-directional label switch path;
a messaging element coupled to the communication element and operable to determine from the return path quality of service object the quality of service configuration for the return path separately from the quality of service configuration for the forward path; and
a label information store manager, coupled to the messaging element to receive the determined quality of service configuration of the return path and coupled to a label information store, and operable to configure a label information context for a quality of service configuration of the return path of the label switched path separately from a quality of service configuration for the forward path using receive the determined quality of service configuration of the return path;
wherein the communication element is operable to send a path reservation message corresponding to the received path set up message to a previous node in the bi-directional label switched path, and
wherein the path set up message enables a plurality of quality of service classes to be supported by the bi-directional label switched path, and
wherein the path set up message defines a mapping for the forward path between each quality of service class and a quality of service treatment and a separately specified mapping for the return path between each quality of service class and a quality of service treatment, such that a forward direction quality of service treatment of the plurality of quality of service classes on the forward path is specified separately from a return direction quality of service treatment of the plurality of quality of service classes on the return path.

14. The apparatus as claimed in claim 12, wherein the apparatus is implemented in a network node of a Generalised Multi-protocol Label Switching (GMPLS) network.

15. A network node, comprising:
apparatus as claimed in claim 12; and
a label information store, coupled to the label information store manager, for storing label information contexts for one or more bi-directional label switched paths having a forward path and a return path.

* * * * *